March 26, 1963 L. HANEWINKEL 3,083,354

INFORMATION STORAGE DEVICE

Filed Oct. 31, 1957 2 Sheets-Sheet 1

Inventor,
Lorenz Hanewinkel.
By Silverman + Mullin
Att'ys.

March 26, 1963 L. HANEWINKEL 3,083,354

INFORMATION STORAGE DEVICE

Filed Oct. 31, 1957 2 Sheets-Sheet 2

Inventor.
Lorenz Hanewinkel,
By Silverman & Mullin
Att'ys.

3,083,354
Patented Mar. 26, 1963

3,083,354

INFORMATION STORAGE DEVICE

Lorenz Hanewinkel, Neukirchen, Germany, assignor to Zuse KG, Neukirchen, Germany Filed Oct. 31, 1957, Ser. No. 693,609
Claims priority, application Germany Nov. 5, 1956
8 Claims. (Cl. 340—174)

This invention relates generally to information processing apparatus, such as for example, digital computers, and more particularly, is concerned with the construction of a novel store or information storage means for such apparatus.

In known information processing apparatus, and particularly in electronic computing apparatus, one of the principal problems is concerned with the storage of information. Machine design, speed of storing and readout, and many other factors revolve about the design, construction and operation of the storage device or devices.

A number of different kinds of storage devices have been evolved and are being used, and considering their mode of operation, these storage devices may be classed as parallel or serial, the latter often being termed a "dynamic storage device."

In the dynamic storage device, information, such as for example, a group of bits or digits of a binary coded number, passes through the dynamic register with the digits or bits following one another in time sequence, so that the individual binary digits are arithmetically processed one after the other. An example of such processing might be the addition to the digits of another number. Dynamic registers of this type have been constructed using delay lines or other delay devices, sections of magnetic drum tracks and the like, wherein at the beginning of a section the digits are recorded and at the end of the section they are read out. The beginning and end of each section may complete a circuit through an amplifier. Another example of such registers comprises the formation of chains of permanently magnetizable closed cores, such as made of ferrites, which are aligned for permitting the shifting of digits of binary numbers, to enable the information to be passed from one core to the next one. The principal disadvantage of this method of storing data is that the frequent switching heats the cores and thus limits the frequency of the impulses which can be processed.

Another arrangement of ferrite cores for the storing of data consists of forming a matrix of these cores, so that the informational data remains substantially permanently in the individual cores whereby frequent shifting is avoided. In such a register, if one wishes to use the matrix as a serial storage device, the columns are interrogated seriatim, and recorded again. The advantages of this structure are decrease, however, because of the need for comparatively expensive electronic equipment to use the same.

The invention here provides as its principal object the alleviation of the disadvantages of previous devices but using the advantages of constructing a storage device which has several serial registers, the principal components of which are ferrite cores.

An important object of the invention is to provide a storage device for data processing apparatus which is characterized by a great degree of simplicity over prior structures using storage elements of the kind described hereinafter.

Still a further important object of the invention is the provision of a device of the character described which comprises the combination of a ferrite core chain with a storage matrix which is formed of ferrite cores. The ferrite core chain functions to interrogate the individual columns of the matrix whose function is according to known principles.

The provision of the novel interrogating means is a still further object of the invention, this being an extremely simple structure, and comprising the ferrite core chain. One constantly circulating impulse is applied to the chain so that the cores need rarely be switched, thus keeping them cool.

The invention is applicable to a wide variety of systems, with equal advantages, and obviously is capable of variation without departing from the spirit or scope of the invention. For the requirements of the patent laws, a preferred embodiment has been illustrated in the accompanying drawings and described in some detail hereinafter, but only by way of example and not limitation.

Briefly described, the invention includes a shift register formed of two ferrite core groups $A_1$–$A_n$ and $B_1$–$B_n$ for controlling a core matrix and it operates in the following manner: One of the cores $B_1$, for example, in group $B_1$–$B_n$ is initially set in one binary state by an input pulse applied at $i_0$. Pulses are thereafter applied alternatively to leads marked I and II connected to windings on cores $B_1$–$B_n$ and $A_1$–$A_n$ respectively. A pulse applied to lead I after core $B_1$ has been set in one binary state returns core $B_1$ to its original binary state and it provides an output pulse that sets core $A_1$ over the unidirectional circuit including diode $D_{11}$ connecting the respective windings of the two cores. Core $A_1$ is thus set in one binary state and a pulse is derived therefrom that is transmitted along the column lead $a_1$ to control the corresponding core column of the matrix for a read operation, for example. Diode $D_{12}$ blocks the connection between cores $A_1$ and $B_2$ at that time.

Thereafter a pulse on lead II resets core $A_1$ to its initial binary state. An output pulse of polarity opposite to the first derived pulse from core $A_1$ is thus applied to the column lead $a_1$ for a write operation, for example. Simultaneously a pulse is provided that is transmitted over diode $D_{12}$ to the core $B_2$ for setting core $B_2$.

Thereafter core $B_2$ is controlled by a pulse occurring on lead II and the process is repeated with respect to core $A_2$ and its associated column lead $a_2$. In this manner, the cores $A_1$–$A_n$ and $B_1$–$B_n$ of the ring are scanned in succession to produce output pulses along the respective column leads $a_1$–$a_n$ for either reading or writing to control the associated core matrix.

Figure 1:
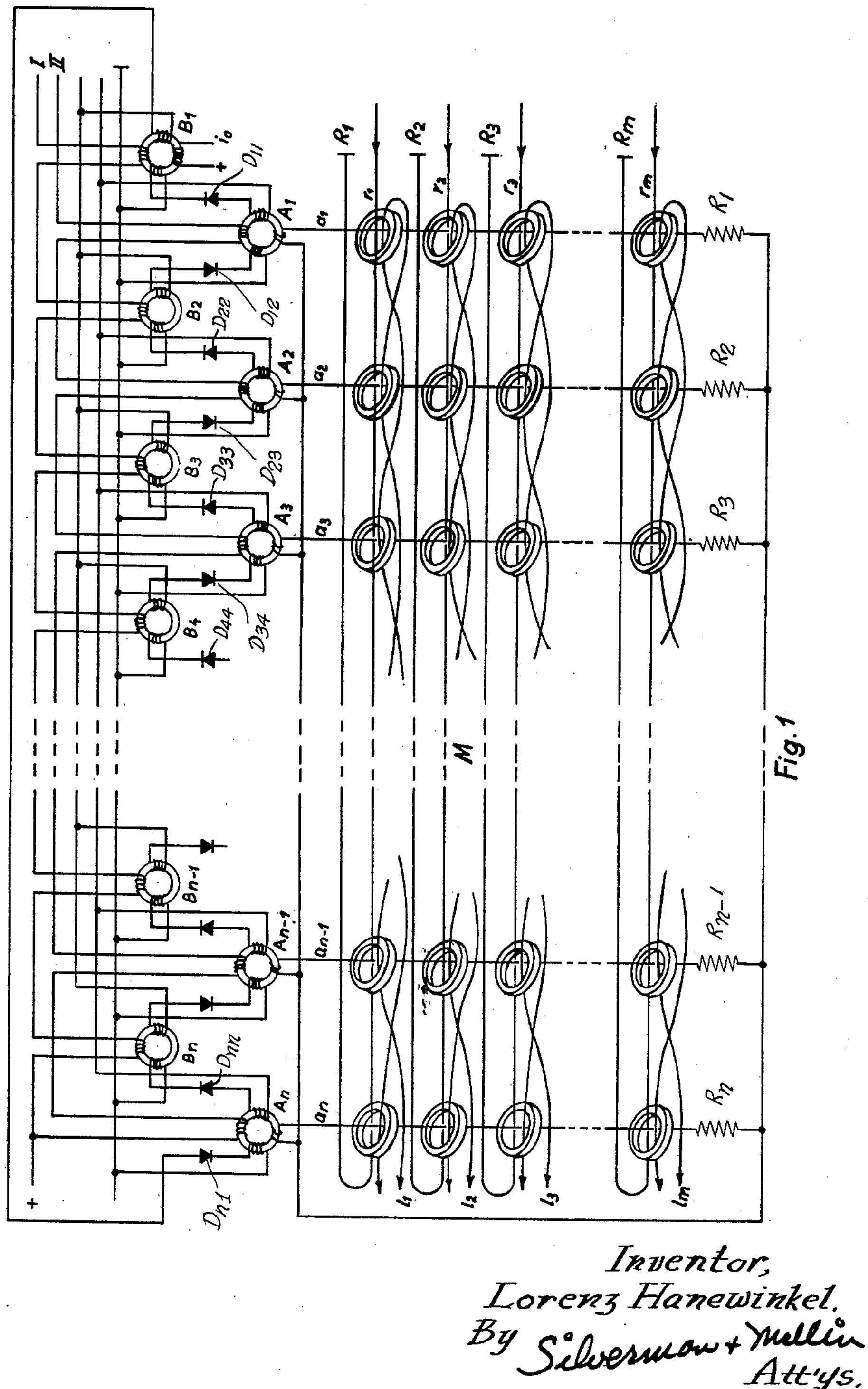
FIG. 1 is a highly diagrammatic circuit diagram illustrating the application of the invention to an information storing device.

Referring now to FIG. 1, the cores $B_1$, $A_1$, $B_2$, $A_2$ . . . $B_n$, $A_n$ represent a chain of cores which is switched together as a circulating magnetic shifting register or static magnetic delay line (note that the output at $A_n$ is connected to the input at $B_1$). A binary ONE which is applied at the winding $i_0$ of $B_1$ in the form of an impulse is shifted from core to core by the shifting impulses alternately applied to the shifting windings at regular intervals through the electrical leads I and II. In order to accomplish this, each core of the chain has an input winding, an output winding and a shifting winding. The output winding of the core $B_1$ is connected with the input winding of the core $A_1$ through the diode $D_{11}$; the output winding of the core $A_1$ is connected with the input winding of the core $B_2$ through the diode $D_{12}$; and the remaining connections are similar, until the last group of cores of the chain in which the output winding of the core $B_n$ is connected with the input winding of the core $A_n$ through the diode $D_{nn}$. The output winding of the core $A_n$ is connected with the input winding of the core $B_1$ through the diode $D_{n1}$ which completes the circuit of the chain and thus renders the chain a circulating register or a delay line in which a number fed into the line will circulate indefinitely.

Each of the cores $B_1$, $B_2$ . . . $B_n$ has a shifting winding all of which are connected in series and all of them receive a shifting impulse in regular sequence from the line I. Likewise, each of the cores $A_1$, $A_2$ . . . $A_n$ has a similar shifting winding, all being connected in series, and all receiving a shifting impulse from the line II which is phase displaced from the impulse which is applied to the line I.

A current impulse applied through the line $i_0$ will magnetize the core $B_1$ according to a state of magnetization which depends upon the polarity of the impulse. A subsequently applied current impulse I magnetizes the core $B_1$ in the opposite state and provides across the output winding a pulse which will magnetize the core $A_1$ through the interposed connection through the diode $D_{11}$. A current impulse from the lead II magnetizes the core $A_1$ back to its original state of magnetization and thus triggers the core $B_2$ through its input winding and the interposed connections which include the diode $D_{12}$.

In an analogous way by subsequent alternating impulses on the leads I and II the magnetization is transferred alternately from a B core to an A core and then back to a B core and so on. The chain of impulses is started merely by a single impulse at the input $i_0$ of the core $B_1$.

The cores $A_1$, $A_2$ . . . $A_n$ have fourth windings in each of which a voltage will be induced for each reversal of mode of magnetization of the respective core. These windings are respectively connected with the leads $a_1$, $a_2$ . . . $a_n$ which serve as column selector leads of the storage matrix designated generally by the reference character M.

The storage matrix M is formed of $n$ times $m$ annular ferrite cores, which are arranged in $m$ rows and $n$ columns. One column selector lead from the chain is threaded with all of the cores of a single column, and one row-selector lead is threaded with all of the cores of a single row. Thus, the lead $a_1$ which is connected with the bottom output wniding of the core $A_1$ is threaded through all of the cores of the first (right-hand) column of the matrix M; the lead $a_2$ which is connected with the bottom output winding of the core $A_2$ is threaded through all of the cores of the second column of matrix M; and this continues with the other column-selector leads similarly connected until the last lead $a_n$ is threaded through all of the cores of the last column (left-hand) of the matrix M. Each of the horizontal rows of the matrix M has a row-selector lead also threading all of the cores in the particular row. Thus, starting at the top row, there is a row-selector lead $r_1$ which threads all of the cores in the top row; the second row has all of the cores threaded by a row-selector lead $r_2$; and this continues with the other row-selector leads similarly connected until the last lead $r_m$ is threaded through all of the cores in the bottommost row of the matrix M.

A read-out or interrogation lead is also threaded through the ferrite storage cores of each horizontal row with the direction of threading changed from core to core to decrease disturbances by neutralization. Such leads are designated $l_1$, $l_2$, $l_3$ . . . $l_m$. As will be mentioned in connection with FIG. 2, the reading or interrogation leads may be connected in series and combined to form a single reading lead which threads all of the storage cores of the matrix M.

During operation, the cores $A_1$, $A_2$, $A_3$ . . . $A_n$ continuously apply alternating positive and negative pulses to the column-selector leads $a_1$, $a_2$, $a_3$ . . . $a_n$ respectively and to the current-limiting resistors $R_1$, $R_2$, $R_3$ which are respectively connected in series with the column-selector leads.

It will be apparent that the B cores are merely intermediaries between the A cores to enable the desired impulses to be applied by the A cores in the same directions.

Figure 2:
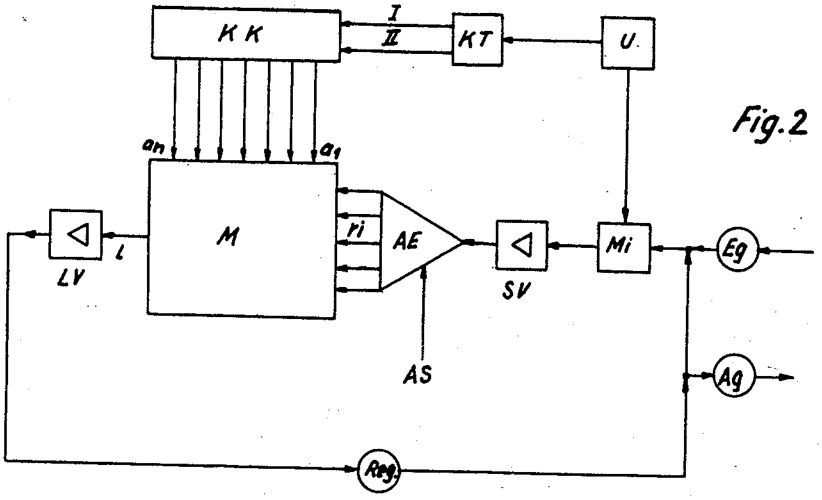
FIG. 2 is a block diagram illustrating a system by means of which the storage device of the invention is activated.
Figure 3:
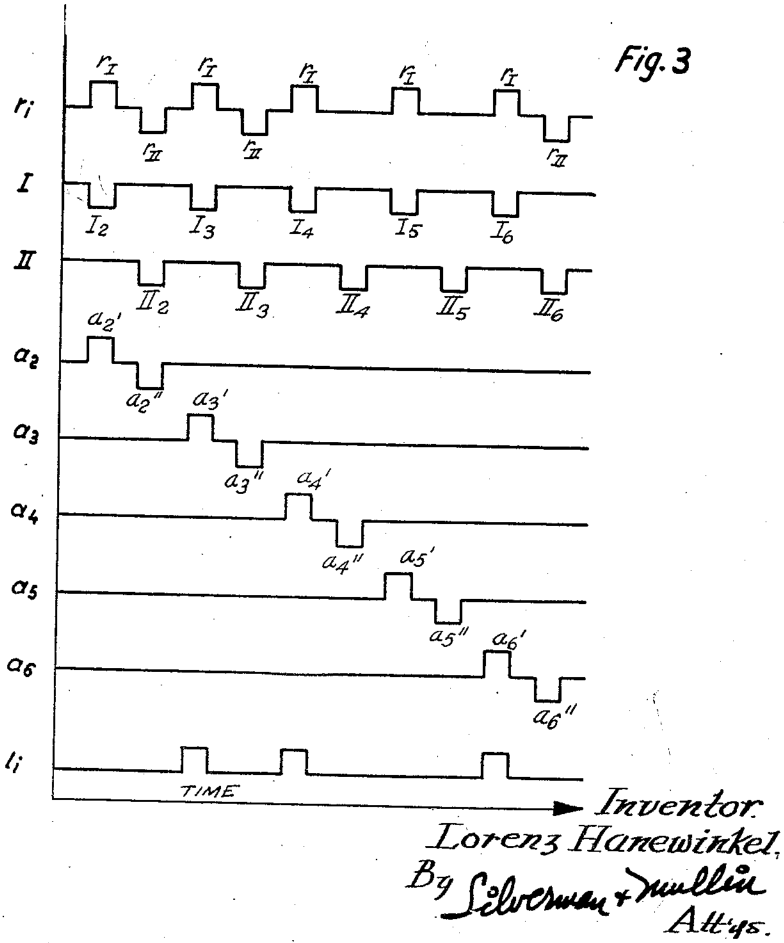
FIG. 3 is a diagrammatic representation of a group of wave forms all drawn on the same time axis, giving an example of the storing information in cores 2 through 6. The binary number 01101 was stored and the number 11001 is to be stored.

FIG. 3 illustrates the impulses in the various leads for a given set of conditions, where the number 01101 was stored and 11001 is to be stored. It is assumed that all of the A and B cores are in a single state of magnetization, and that only the core $B_2$ has its state of magnetization reversed. The impulses which are represented at the leads I and II are provided by a timing mechanism such as a clock controlled source U (see FIG. 2) which controls the ferrite core chain driving means KT. The next impulse on the lead I will be $I_2$ which will reverse the core $B_2$ to its original state of magnetization and thus cause $A_2$ to have a reversal of magnetization. This, therefore, causes a positive impulse $a_2'$ to appear in the column lead $a_2$. The next impulse $II_2$ on the lead II will suddenly reverse the magnetization of the core $A_2$ and generates a negative impulse $a_2''$, in the column-selector lead $a_2$. Simultaneously, the core $B_3$ is affected by the reversal of magnetization. Timing impulses $I_3$ and $II_3$ repeat the same procedure at the core A and the impulses $a_3'$ and $a_3''$ will be generated in the column-selector lead $a_3$. The positive and negative pulses provided in all of the column-selector leads $a_4$, $a_5$, $a_6$ and so on are produced in the same way.

The currents which flow in the column-selector leads have half the amplitude required to saturate the magnetic cores of the matrix M. The other half of the current required to produce sufficient flux for saturation in any given core is provided by the row-selector leads $r_1$, $r_2$, $r_3$ . . . $r_m$, and one of these leads is selected to trigger off the desired cores. In the example of FIG. 3, the row-selector lead is $r_1$.

In the arrangement herein, positive impulses $r_I$ on a row-selector lead occurring in coincidence with the timing pulses of the lead I serve to make the matrix cores equal to zero and to read them out. The negative impulses $r_{II}$ which occur in coincidence with the timing pulses of the lead II will be present according to the information to be registered or written in, or will be omitted. The example shows the registration of the binary number 11001. Whenever there is a reversal of magnetization in a matrix core there will be a potential impulse induced in the reading lead $l_1$.

As previously stated, the interrogating leads $l_1$, $l_2$ . . . $l_m$ or the single lead as usually used, are threaded through the cores so that the disturbances which comprise the half signals will neutralize one another. This is done by threading the leads in alternating directions through the cores. The leads of the individual rows are correspondingly connected in series one after the other to form a total interrogating lead, but with electronic amplifiers between the individual leads to compensate for losses.

Due to the alternate threading of the interrogating lead, the voltage impulses from the individual cores are present in alternating polarity. Furthermore, when writing into the matrix, voltage impulses are also induced in the output lead extending to the amplifier LV which may be provided with suitable means for suppressing such disturbances.

Referring now to FIG. 3, information is read off line $R_1$ which in this example is the binary number 01101. This now means that prior to the combined reading and writing process as described, in the line $R_1$ the cores of the columns 3, 4 and 6 had received the information ONE.

Referring to FIG. 2, the block diagram illustrates an example of the manner in which the storage unit of the invention is pulsed for the purposes of using the same in a data processing device. The clock-controlled mechanism U provides timing pulses to the core chain driving means KT which provides the pulses in I and II out of phase with one another, continuously. These pulses are applied to the chain which is here represented as the block KK, and as a result of these pulses, single pulses are applied through the leads $a_1$, $a_2$ . . . $a_n$ to the vertical columns of the matrix M. The information which is to be stored is applied either from an input source $E_g$ or by way of a regeneration or feed-back path R*eg* to the mixing stage M*i*. In the latter case, the information will remain preserved. The impulses from the timer mechanism U when mixed with the input information are suitably for writing or applying to the device, and thereafter are applied to an amplifier SV and thence to an address decoder AE which is operated by an address control device AS. The impulses are fed at the lead $r_x$ of the *x*th horizontal row of the matrix by the decoder AE.

The read-out information arrives as an impulse $l_1$ (see bottom series of wave forms in FIG. 3) at the amplifier LV which is provided for the read-out leads and the read-out information is available at the output A*g*.

The storage unit may operate also simultaneously with several row registers, in which case the address decoder AE would be omitted and several reading and writing amplifiers would have to be provided.

In the claims which follow, the expression "magnetic cores" will be used to designate permanently magnetizable cores usually of closed or annular construction whose hysterisis characteristics are such as to provide for relatively sharp changes from one magnetized state to another, with accompanying induction of voltage impulses in output windings which may be wound thereon.

What it is desired to secure by Letters Patent of the United States is:

1. An information storage device comprising a matrix of magnetic cores capable of assuming bistable states of magnetic remanence, arranged in rows and columns of said matrix for serial storage of binary information in respective rows, a counting chain comprising a magnetic core shifting register connected upon itself, the cores of said chain each having an input winding and a shifting winding, alternate cores being provided with a second output winding, said second output winding being connected to column leads of said matrix, means reversing the magnetization of the cores of the said chain and providing pulses therein to apply a reading impulse in each column in one direction followed by a restoring impulse in the opposite direction, said impulses being of insufficient amplitude to reverse the magnetization of said cores of said matrix, and means for applying additional impulses to selected ones of the rows of said matrix which when combined with said reading pulses will be sufficient to reverse magnetization in said cores of said matrix, whereby to store said information in the form of magnetization of cores according to the sequence of said additional impulses.

2. A device as claimed in claim 1 in which means are provided coupled with all of the said matrix cores for continuously reading the same out.

3. An information storage device, which comprises a matrix of magnetic cores capable of assuming bistable states of magnetic remanence, and said matrix having column selector leads and row selector leads, for the synchronization control of the individual cores and with read-out leads for reading out the information stored in one row, a magnetic core shifting register connected as a delay line having as many counting steps as columns in the matrix, each counting step being connected to one of the said column selector leads, each counting step including two cores, each of said cores having an input winding, at least one output winding, and a shifting winding, a timer having means for producing continuous timing pulses on two channels with the pulses of one channel out of phase with the pulses on the other channel, one channel being connected to the shifting winding of one of each of said two cores of each counting step, and the other channel being connected to the second of each of said two cores, each of said second of said two cores having an additional output winding for providing reading and writing pulses to the respective connections to the matrix columns responsive to a shift in each counting step controlled by said one and other channel.

4. An information storage device according to claim 3 having writing means for transmitting writing pulses to said row selector leads, switching means arranged to apply said pulses to any one of the said row selector leads, and means coupled with each of the said cores of said matrix for reading out the information stored therein.

5. An information storage device according to claim 4 in which a feedback channel is provided between said reading out means and said writing means for continuously regenerating the information read out.

6. In a magnetic shift register for use in controlling a matrix of magnetic cores capable of assuming bistable states of magnetic remanence, said matrix being arranged in rows and columns; the improvement comprising: said register having a pair of magnetic binary cores for each of a plurality of said columns with one core of each pair connected to one common signal input source, and the second core of each pair connected to a second common signal input source, a first unidirectional circuit connecting the one core of each pair with the second core of its respective pair, the second core of each pair having first and second output circuits connected therefrom, the first output circuit extending to a respective column of cores of said matrix and adapted to be coupled therewith, the second output circuit extending to and coupled with the first core of the succeeding pair of cores of said register, whereby an input pulse applied from said one common signal input source to said one core of a respective pair having one binary state causes the one core to provide a first output pulse by way of said first unidirectional circuit to the second core of the same pair to control said second core and thereby providing a second output pulse from said second core by way of its first output circuit extending to the respective column of cores, and an input pulse applied from said second common signal input source to said second core of said respective pair controls said second core to provide a third output pulse of a character different from said second output pulse by way of said first output circuit extending to said respective column of cores and a fourth output pulse by way of the second output circuit for placing the first core of the succeeding pair of cores in said one binary state.

7. The arrangement claimed in claim 6 in which each of said second output circuits has a second unidirectional circuit connection to the first core of the succeeding pair.

8. A magnetic shift register comprising a plurality of sequentially arranged core pairs with one core of each pair having a first common input source and the second core of each pair having a second common input source, a first unidirectional circuit connecting the one core of each pair with the second core of each pair, a second unidirectional circuit connecting the second core of each pair with the one core of a succeeding pair whereby the successive application of input pulses from the respective input sources to the one core of a pair having one binary magnetic condition provides a first output pulse from said one core to the second core of said pair to place said second core in a certain binary magnetic condition, and the pulse from said second source thereafter applied to said second core resets said second core to an initial binary magnetic condition to provide an output pulse for placing the one core of a succeeding pair in said one binary magnetic condition, and an output circuit for each second core arranged to provide respective output pulses to a core matrix responsive to the placing of the respective second core in the certain and said initial binary mangetic conditions.

(References on following page)

References Cited in the file of this patent

UNITED STATES PATENTS

| | | |
|---|---|---|
| 2,654,080 | Browne | Sept. 29, 1953 |
| 2,730,695 | Ziffer | Jan. 10, 1956 |
| 2,814,031 | Davis | Nov. 19, 1957 |
| 2,820,956 | Rueger | Jan. 21, 1958 |
| 2,824,294 | Saltz | Feb. 18, 1958 |
| 2,844,812 | Overvach | July 22, 1958 |
| 2,844,815 | Winich | July 22, 1958 |
| 2,896,193 | Herrmann | July 21, 1959 |
| 2,931,014 | Buchholz et al. | Mar. 29, 1960 |
| 2,931,022 | Triest | Mar. 29, 1960 |
| 2,946,985 | McMillan et al. | July 26, 1960 |
| 2,959,770 | Eckert | Nov. 8, 1960 |

OTHER REFERENCES

German application I, 10,417, Oct. 11, 1956.